United States Patent
Sasaki et al.

(10) Patent No.: US 11,018,749 B2
(45) Date of Patent: May 25, 2021

(54) OAM MULTIPLEXING COMMUNICATION SYSTEM AND INTER-MODE INTERFERENCE COMPENSATION METHOD

(71) Applicant: NIPPON TELEGRAPH AND TELEPHONE CORPORATION, Tokyo (JP)

(72) Inventors: Hirofumi Sasaki, Musashino (JP); Doohwan Lee, Musashino (JP); Hiroyuki Fukumoto, Musashino (JP); Hiroyuki Shiba, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/043,492

(22) PCT Filed: Mar. 28, 2019

(86) PCT No.: PCT/JP2019/013896
§ 371 (c)(1),
(2) Date: Sep. 29, 2020

(87) PCT Pub. No.: WO2019/189706
PCT Pub. Date: Oct. 3, 2019

(65) Prior Publication Data
US 2021/0111781 A1    Apr. 15, 2021

(30) Foreign Application Priority Data

Mar. 30, 2018    (JP) .............................. JP2018-069124

(51) Int. Cl.
*H04L 5/12*    (2006.01)
*H04L 23/02*   (2006.01)
(Continued)

(52) U.S. Cl.
CPC ........... *H04B 7/0697* (2013.01); *H01Q 21/20* (2013.01); *H04B 7/0469* (2013.01); *H04B 7/0482* (2013.01); *H04L 5/04* (2013.01)

(58) Field of Classification Search
CPC .. H04B 7/0697; H04B 7/0469; H04B 7/0482; H04L 5/04; H01Q 21/20
(Continued)

(56) References Cited

U.S. PATENT DOCUMENTS

2017/0026095 A1*  1/2017  Ashrafi ................. H04L 9/0852
2017/0170574 A1*  6/2017  Sacco ...................... H01Q 3/40
(Continued)

OTHER PUBLICATIONS

Dengke Xing, Jianfei Liu, Liangye Zeng, Jai Lu, Mengjun Wang, Crosstalk Mitigation in a Fee Space Orbital Angular Momentum Multiplexing System Based on ICA, 2017 16th International Conference on Optical Communications and Networks (ICOCN) (Year: 2017).*

(Continued)

*Primary Examiner* — Tanmay K Shah
(74) *Attorney, Agent, or Firm* — Harness, Dickey & Pierce, P.L.C.

(57) ABSTRACT

An OAM multiplexing communication system multiplexes signals of one or more sequences for each OAM mode. A transmitting station includes a transmitting antenna using an M-UCA, and an OAM mode generation unit that simultaneously generates one or more OAM modes from each UCA. A receiving station includes a receiving antenna equivalent to the M-UCA, an OAM mode separation unit that separates signals received by each UCA for each OAM mode, and a channel estimation/interference compensation unit that compensates for inter-mode interference between the OAM modes by using a weight. The channel estimation/interference compensation unit selects, for each OAM mode, signals of a subject mode and an adjacent mode from among
(Continued)

the signals of the OAM modes separated by the OAM mode separation unit, and compensates for the inter-mode interference by multiplying an approximate weight calculated by using channel matrixes of the subject mode and the adjacent mode.

6 Claims, 7 Drawing Sheets

(51) Int. Cl.
    *H04B 7/06*       (2006.01)
    *H01Q 21/20*     (2006.01)
    *H04L 5/04*       (2006.01)
    *H04B 7/0456*    (2017.01)

(58) Field of Classification Search
    USPC .......................................................... 375/262
    See application file for complete search history.

(56) References Cited

U.S. PATENT DOCUMENTS

| | | | |
|---|---|---|---|
| 2017/0187442 A1* | 6/2017 | Luddy | H04L 25/03898 |
| 2018/0034556 A1* | 2/2018 | Willner | H04B 10/70 |
| 2019/0334609 A1* | 10/2019 | Alavi | H01Q 21/20 |

OTHER PUBLICATIONS

Dengke Zhang, Zue Feng, Kaiyu Cui, Fang Liu, and Yidong Huang, On-chip identifying topology charges of OAM beams with multi-beam interference, CLEO-2013 Technical Digest (Year: 2013).*

Eisau Sasaki, Masahi Hirabe, Tsuguo Maru, Nader Zein, Pragmatic OAM with Polarization Multiplexing Transmission for future 5G Ultra-High Capacity Radio, 2016 EuMA (Year: 2016).*

E.Sasaki, M.Hirabe, T.Maru, N.Zein,"Pragmatic OAM with polarization multiplexing transmission for future 5G ultra-high capacity radio", inproc.of EuMA2016,Oct. 2016.

International Search Report issued in PCT/JP2019/013896, dated Jun. 25, 2019.

* cited by examiner

TRANSMITTING OAM MODE k

| | −2 | −1 | 0 | 1 | 2 |
|---|---|---|---|---|---|
| −2 | $H_{-2,-2}$ | $H_{-2,-1}$ | $H_{-2,0}$ | $H_{-2,1}$ | $H_{-2,2}$ |
| −1 | $H_{-1,-2}$ | $H_{-1,-1}$ | $H_{-1,0}$ | $H_{-1,1}$ | $H_{-1,2}$ |
| 0 | $H_{0,-2}$ | $H_{0,-1}$ | $H_{0,0}$ | $H_{0,1}$ | $H_{0,2}$ |
| 1 | $H_{1,-2}$ | $H_{1,-1}$ | $H_{1,0}$ | $H_{1,1}$ | $H_{1,2}$ |
| 2 | $H_{2,-2}$ | $H_{2,-1}$ | $H_{2,0}$ | $H_{2,1}$ | $H_{2,2}$ |

RECEIVING OAM MODE k

TRANSMITTING OAM MODE k

| | | -2 | -1 | 0 | 1 | 2 |
|---|---|---|---|---|---|---|
| RECEIVING OAM MODE k | -2 | $H_{-2,-2}$ | $H_{-2,-1}$ | 0 | 0 | 0 |
| | -1 | $H_{-1,-2}$ | $H_{-1,-1}$ | $H_{-1,0}$ | 0 | 0 |
| | 0 | 0 | $H_{0,-1}$ | $H_{0,0}$ | $H_{0,1}$ | 0 |
| | 1 | 0 | 0 | $H_{1,0}$ | $H_{1,1}$ | $H_{1,2}$ |
| | 2 | 0 | 0 | 0 | $H_{2,1}$ | $H_{2,2}$ |

OAM MULTIPLEXING COMMUNICATION SYSTEM AND INTER-MODE INTERFERENCE COMPENSATION METHOD

CROSS-REFERENCE TO RELATED APPLICATIONS

This application is a 371 U.S. National Phase of International Application No. PCT/JP2019/013896, filed on Mar. 28, 2019, which claims priority to Japanese Application No. 2018-069124, filed on Mar. 30, 2018. The entire disclosures of the above applications are incorporated herein by reference.

TECHNICAL FIELD

The present invention relates to an OAM multiplexing communication system and an inter-mode interference compensation method that subject a radio signal to spatial multiplex transmission by using orbital angular momentum (OAM) of an electromagnetic wave.

BACKGROUND ART

There is a technique that subjects a radio signal to spatial multiplex transmission by using OAM, as a technique for improving a transmission capacity in wireless communication. An electric wave having an OAM mode has a feature that an equiphase surface thereof is distributed in a spiral form along a rotational direction centering on a propagation axis of a beam. A mode in which a cycle of the spiral formed by the equiphase surface is $2\pi \times a$ is referred to as an OAM mode a. Since different OAM modes have orthogonality in a rotational direction, it is possible to subject signals of a plurality of OAM modes to spatial multiplex transmission. For example, since a signal of an OAM mode 1 and a signal of an OAM mode 2 are orthogonal to each other on a space, it is possible to separate the signal of the OAM mode 1 and the signal of the OAM mode 2 from each other by an OAM mode separation circuit on a receiving side, even though the signals of those modes are simultaneously transmitted from a transmitting antenna. As a method for subjecting signals of OAM modes to multiplex transmission, Non-Patent Document 1 reports a method that uses a uniform circular array (UCA) in which a plurality of antenna elements are disposed circularly at an equal interval and a Butler matrix circuit.

PRIOR ART DOCUMENT

Non-Patent Document

Non-Patent Document 1: E. Sasaki, M. Hirabe, T. Maru, N. Zein, "Pragmatic OAM with polarization multiplexing transmission for future 5G ultra-high capacity radio", in proc. of EuMA2016, October 2016.

SUMMARY OF INVENTION

Problems to be Solved by the Invention

In the case of the configuration disclosed in Non-Patent Document 1, signals of respective OAM modes can be separated only in a line-of-sight situation where a transmitting UCA and a receiving UCA are disposed at positions facing each other and there is no reflected wave. However, in an actual operation, it is necessary to consider a case where the transmitting UCA and the receiving UCA are provided at fixed positions deviated from the front facing disposition, or an influence of the reflected wave or the like due to a surrounding environment. When a channel matrix between the transmitting UCA and the receiving UCA is deviated from the ideal front facing disposition due to the influence, an interference component between OAM modes remains in an output stage of the OAM mode separation circuit of the receiving side.

For example, when the receiving side tries to separate a signal of an OAM mode 1, it is possible to extract only a signal component of the OAM mode 1 when the transmitting UCA and the receiving UCA are in a state of the ideal front facing disposition. On the other hand, when the transmitting UCA and the receiving UCA are provided at fixed positions deviated from the ideal front facing disposition, or when the channel matrix is deviated from the ideal one due to the influence of the reflected wave, a propagation path, an RF circuit and the like, an interference component of another mode such as the adjacent OAM mode 2 or OAM mode 0 is superimposed on the signal component of the OAM mode 1 at a circuit output stage and thus communication quality is deteriorated, even though separation of the signal of the OAM mode 1 is tried.

An object of the present invention is to provide an OAM multiplexing communication system and an inter-mode interference compensation method that can compensate, with a small computation amount, for inter-mode interference caused by a deviation of an optical axis between a transmitting UCA and a receiving UCA, a tilt, a reflected wave, and the like.

Means for Solving the Problems

A first invention is directed to an OAM multiplexing communication system that uses one or more OAM modes and multiplexes signals of one or more sequences for each OAM mode. The OAM multiplexing communication system includes a transmitting station and a receiving station. The transmitting station includes: a transmitting antenna that uses an M-UCA in which a plurality of UCAs having different diameters are concentrically disposed; and an OAM mode generation unit that simultaneously generates the one or more OAM modes from each UCA of the transmitting antenna. The receiving station includes: a receiving antenna that has a configuration equivalent to the M-UCA; an OAM mode separation unit that separates signals received by each UCA of the receiving antenna for each OAM mode; and a channel estimation/interference compensation unit that estimates a channel matrix for each OAM mode separated from the signals received by the each UCA of the receiving antenna, and compensates for inter-mode interference between the OAM modes by using a weight calculated from the channel matrix. The channel estimation/interference compensation unit is configured to select, for each OAM mode, signals of a subject mode and an adjacent mode from among the signals of the OAM modes separated by the OAM mode separation unit, and to compensate for the inter-mode interference by multiplying an approximate weight calculated by using channel matrixes of the subject mode and the adjacent mode.

In the OAM multiplexing communication system of the first invention, the channel estimation/interference compensation unit is configured to determine, as a range of the adjacent mode, a range in which a performance of an equalization process using the approximate weight calculated based on a known signal sequence transmitted from the transmitting station satisfies a predetermined criterion.

In the OAM multiplexing communication system of the first invention, the channel estimation/interference compensation unit is configured to use an approximate channel matrix obtained by approximating the channel matrix as a band matrix to compensate for the inter-mode interference based on Cholesky decomposition of a matrix including the approximate channel matrix.

A second invention is directed to an inter-mode interference compensation method for an OAM multiplexing communication system that uses one or more OAM modes and multiplexes signals of one or more sequences for each OAM mode. The OAM multiplexing communication system includes a transmitting station and a receiving station. The transmitting station includes:

a transmitting antenna that uses an M-UCA in which a plurality of UCAs having different diameters are concentrically disposed; and an OAM mode generation unit that simultaneously generates the one or more OAM modes from each UCA of the transmitting antenna. The receiving station includes: a receiving antenna that has a configuration equivalent to the M-UCA; an OAM mode separation unit that separates signals received by each UCA of the receiving antenna for each OAM mode; and a channel estimation/interference compensation unit that estimates a channel matrix for each OAM mode separated from the signals received by the each UCA of the receiving antenna, and compensates for inter-mode interference between the OAM modes by using a weight calculated from the channel matrix. The inter-mode interference compensation method includes: selecting, by the channel estimation/interference compensation unit, for each OAM mode, signals of a subject mode and an adjacent mode from among the signals of the OAM modes separated by the OAM mode separation unit, and compensating for the inter-mode interference by multiplying an approximate weight calculated by using channel matrixes of the subject mode and the adjacent mode.

In the inter-mode interference compensation method of the second invention, the channel estimation/interference compensation unit determines, as a range of the adjacent mode, a range in which a performance of an equalization process using the approximate weight calculated based on a known signal sequence transmitted from the transmitting station satisfies a predetermined criterion.

In the inter-mode interference compensation method of the second invention, the channel estimation/interference compensation unit uses an approximate channel matrix obtained by approximating the channel matrix as a band matrix to compensate for the inter-mode interference based on Cholesky decomposition of a matrix including the approximate channel matrix.

Effect of the Invention

According to the present invention, regarding the inter-mode interference caused by the deviation of the optical axis between the transmitting UCA and the receiving UCA, the tilt, the reflected wave, and the like, it is possible to compensate for the inter-mode interference with a small computation amount by performing the equalization process with restricting a range of interference of the adjacent mode for each OAM mode.

EMBODIMENTS

Figure 1:
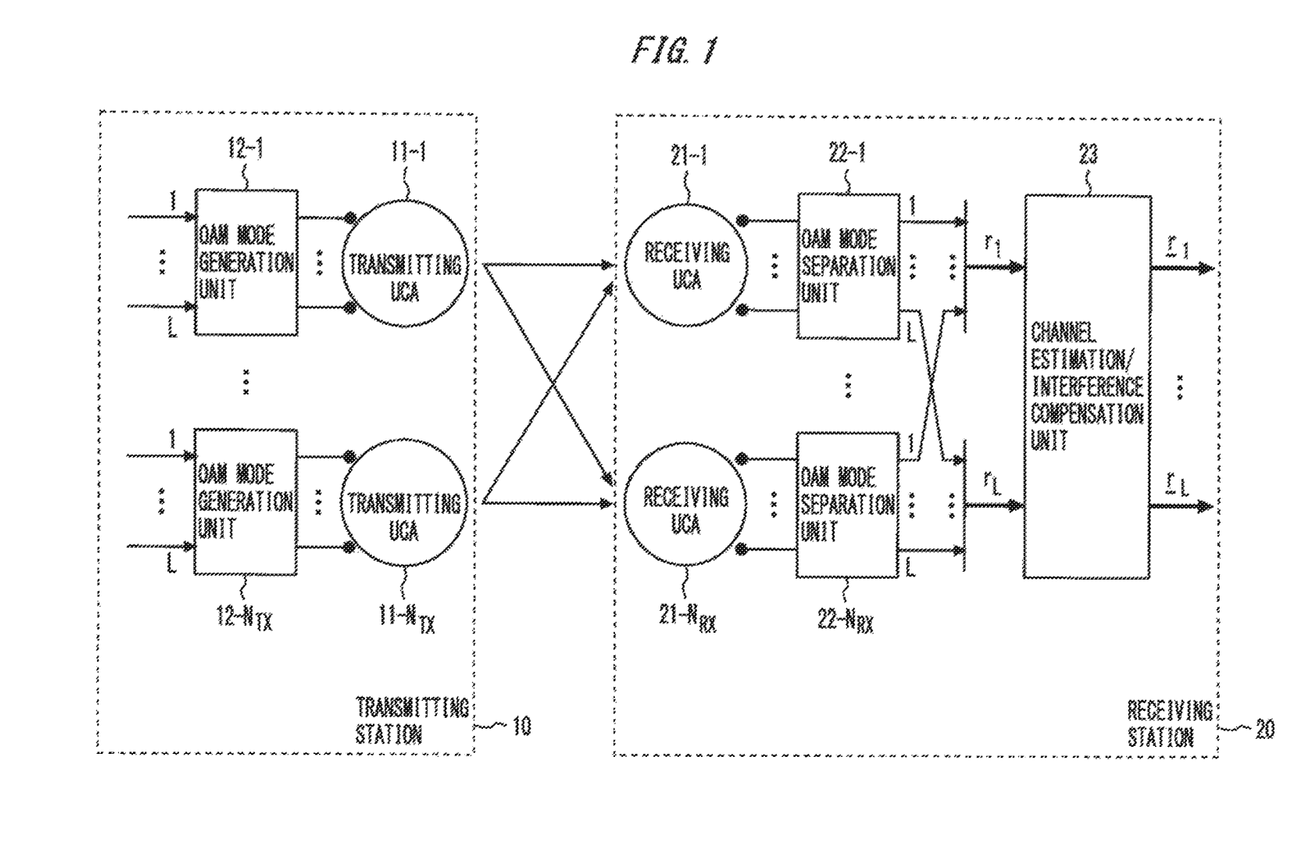
FIG. 1 is a diagram showing a configuration example of an OAM multiplexing communication system according to the present invention.

FIG. 1 is a diagram showing a configuration example of an OAM multiplexing communication system according to the present invention.

In FIG. 1, a transmitting station 10 includes a plurality of transmitting UCAs 11-1 to 11-$N_{TX}$ as transmitting antennae, and OAM mode generation units 12-1 to 12-$N_{TX}$ each of which receives modulation signals of a plurality of sequences respectively transmitted in OAM modes 1 to L, adjusts phases of the signals to be transmitted as signals of the OAM modes 1 to L, and outputs the signals to antenna elements of each transmitting UCA.

A receiving station 20 includes a plurality of receiving UCAs 21-1 to 21-$N_{RX}$ as receiving antennae, OAM mode separation units 22-1 to 22-$N_{RX}$ each of which separates the signals of the OAM modes 1 to L from signals received by each receiving UCA, and a channel estimation/interference compensation unit 23 that receives signals $r_1$ to $r_L$ collected for each of the OAM modes 1 to L, and performs channel estimation and interference compensation to output signals $\underline{r}_1$ to $\underline{r}_L$.

Here, L is the number of OAM modes in use, and 1 to L each indicates a number of the OAM mode. If L=5, for example, signals of the OAM modes −2, −1, 0, 1, and 2 are multiplexed and transmitted. Any one the OAM modes is hereinafter referred to as an OAM mode k.

Figure 2:
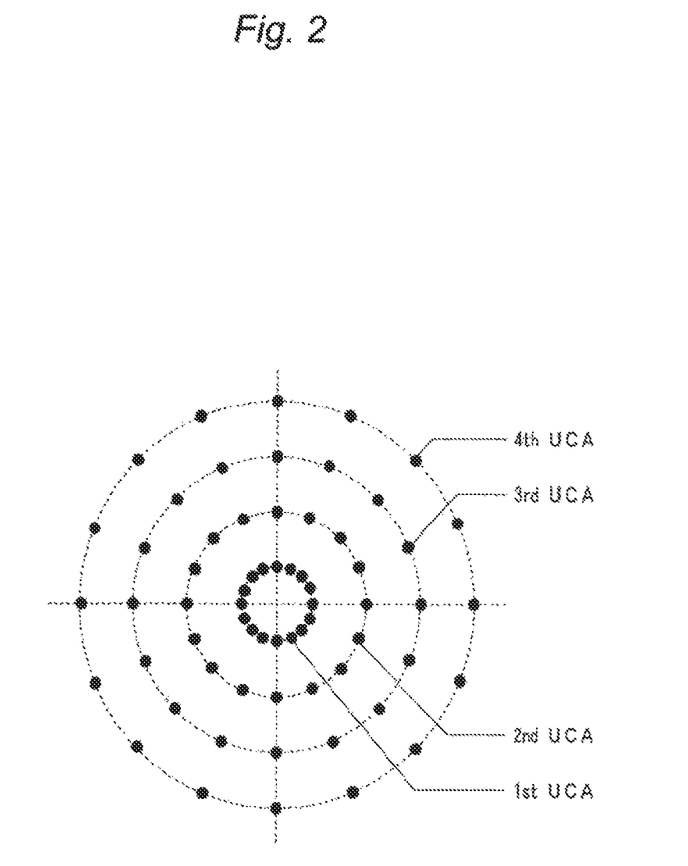
FIG. 2 is a diagram showing a configuration example of an M-UCA of the OAM multiplexing communication system according to the present invention.

The transmitting UCAs 11-1 to 11-$N_{TX}$ and the receiving UCAs 21-1 to 21-$N_{RX}$ constitute a multi-uniform circular array (Multi-UCA) in which a plurality of UCAs are concentrically disposed as shown in FIG. 2. Herein, a configuration in which four UCAs having different radii with each other are disposed is shown. In other words, $N_{TX}$=$N_{RX}$=4, and the UCAs are referred to as a first UCA, a second UCA, a third UCA, and a fourth UCA in this order from the inner UCAs. As an example, each UCA includes sixteen antenna elements indicated by • in FIG. 2, but the number of antenna elements of each UCA is not necessarily required to be the same.

Figure 3:
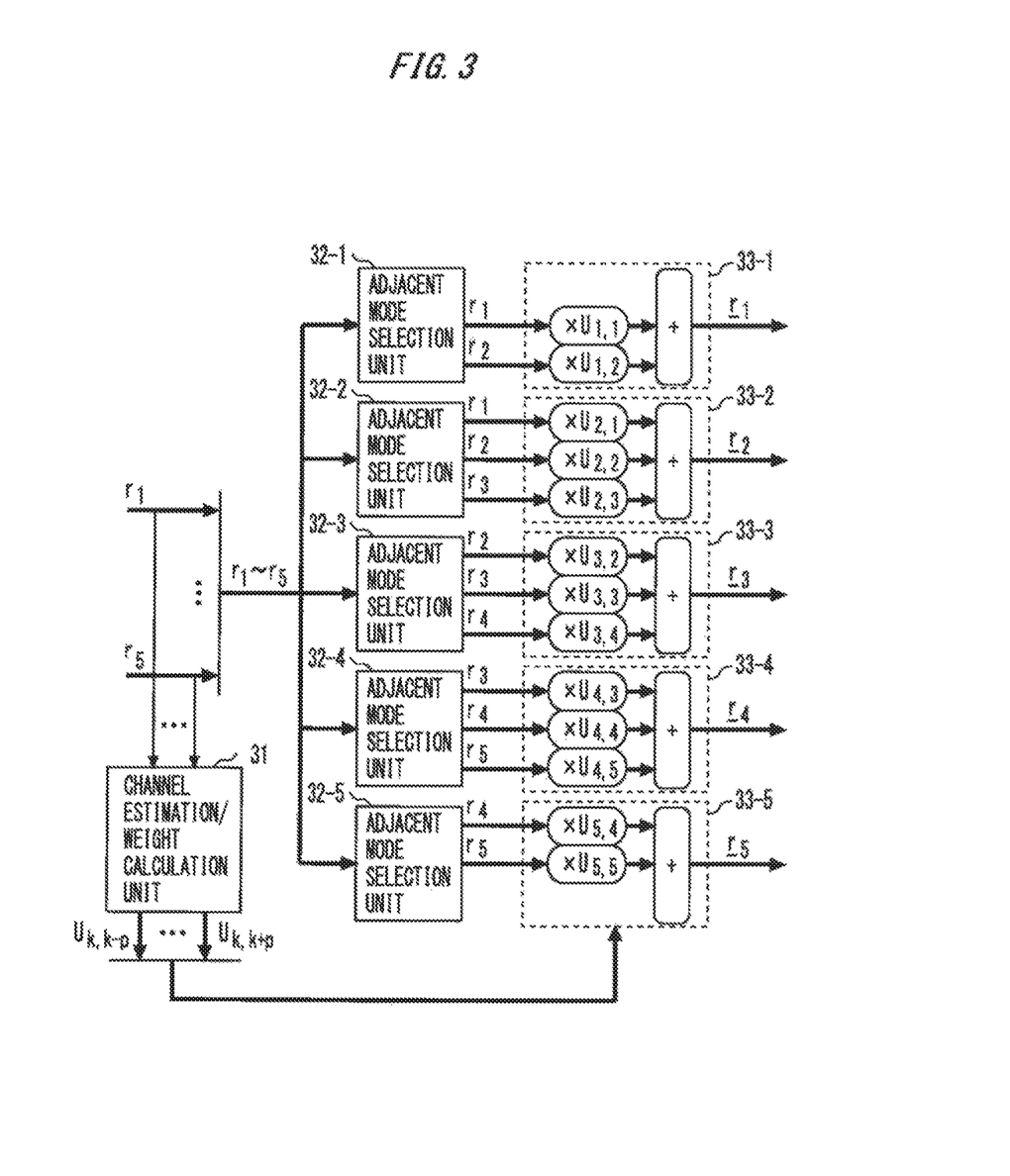
FIG. 3 is a diagram showing a configuration example of a channel estimation/interference compensation unit 23.

FIG. 3 shows a configuration example of the channel estimation/interference compensation unit 23. Here, L is assumed to be 5, and the OAM modes 1 to 5 are represented.

In FIG. 3, the channel estimation/interference compensation unit 23 receives the signals $r_1$ to $r_5$ obtained by the OAM mode separation units 22-1 to 22-$N_{RX}$ that separate the received signals for each of the OAM modes 1 to 5 and collect the signals for each of the OAM modes 1 to 5. In other words, the signal $r_k$ of the OAM mode k is a set of signals of the OAM mode k received by the receiving UCAs 21-1 to 21-$N_{RX}$. The signal $r_1$ of the OAM mode 1 to the signal $r_5$ of the OAM mode 5 are input not only to a channel estimation/weight calculation unit 31 but also to weight multiplication units 33-1 to 33-5 through adjacent mode selection units 32-1 to 32-5 such that the signals are subjected to interference compensation.

Figure 4:
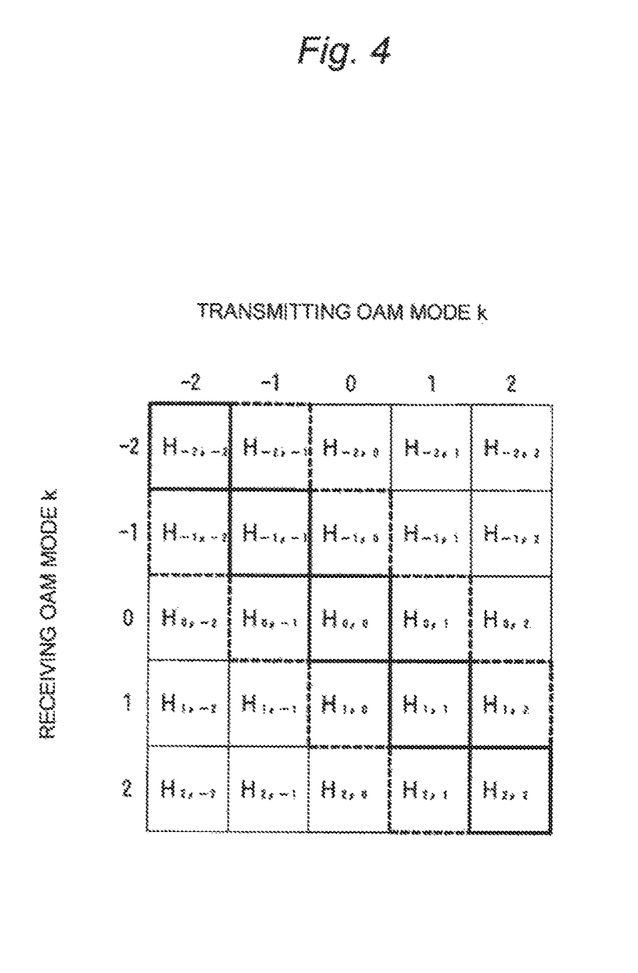
FIG. 4 is a diagram showing an example of a channel matrix.

The channel estimation/weight calculation unit 31 estimates a channel matrix H between the OAM modes combined via the OAM mode generation units 12 of the transmitting station 10, propagation channels, and the OAM mode separation units 22 of the receiving station 20 when the signals of the OAM modes 1 to 5 are multiplexed and transmitted. The channel estimation/weight calculation unit 31 further calculates weights $U_{k,k-p}$ to $U_{k,k+p}$ used for compensating for interference of the signals of each OAM mode. A description of p indicating a range of an adjacent mode with respect to a subject mode will be made later The channel matrix H between the transmitting OAM mode and the receiving OAM mode is shown in FIG. 4. Here, an example in a case of the OAM modes −2, −1, 0, 1, and 2 is shown. In an ideal situation where the transmitting UCA and the receiving UCA are disposed to completely face each other, signals of the respective OAM modes are orthogonal to each other, and thus only a diagonal block component $H_{k,k}$ is present and remaining components are 0. However, in a situation where inter-mode interference occurs due to displacement, incompleteness of an analog circuit, and the like, the equalization process is performed with respect to the signals of the OAM mode k is performed by using channel matrixes $H_{k,k-p}$ to $H_{k,k+p}$ in which non-diagonal block components that are p adjacent modes are taken into consideration and the weights $U_{k,k-p}$ to $U_{k,k+p}$ calculated by using inverse matrixes thereof. As a method of calculating the weights, a zero-forcing (ZF) method or a minimum mean-square-error (MMSE) method may be used.

Figure 5:
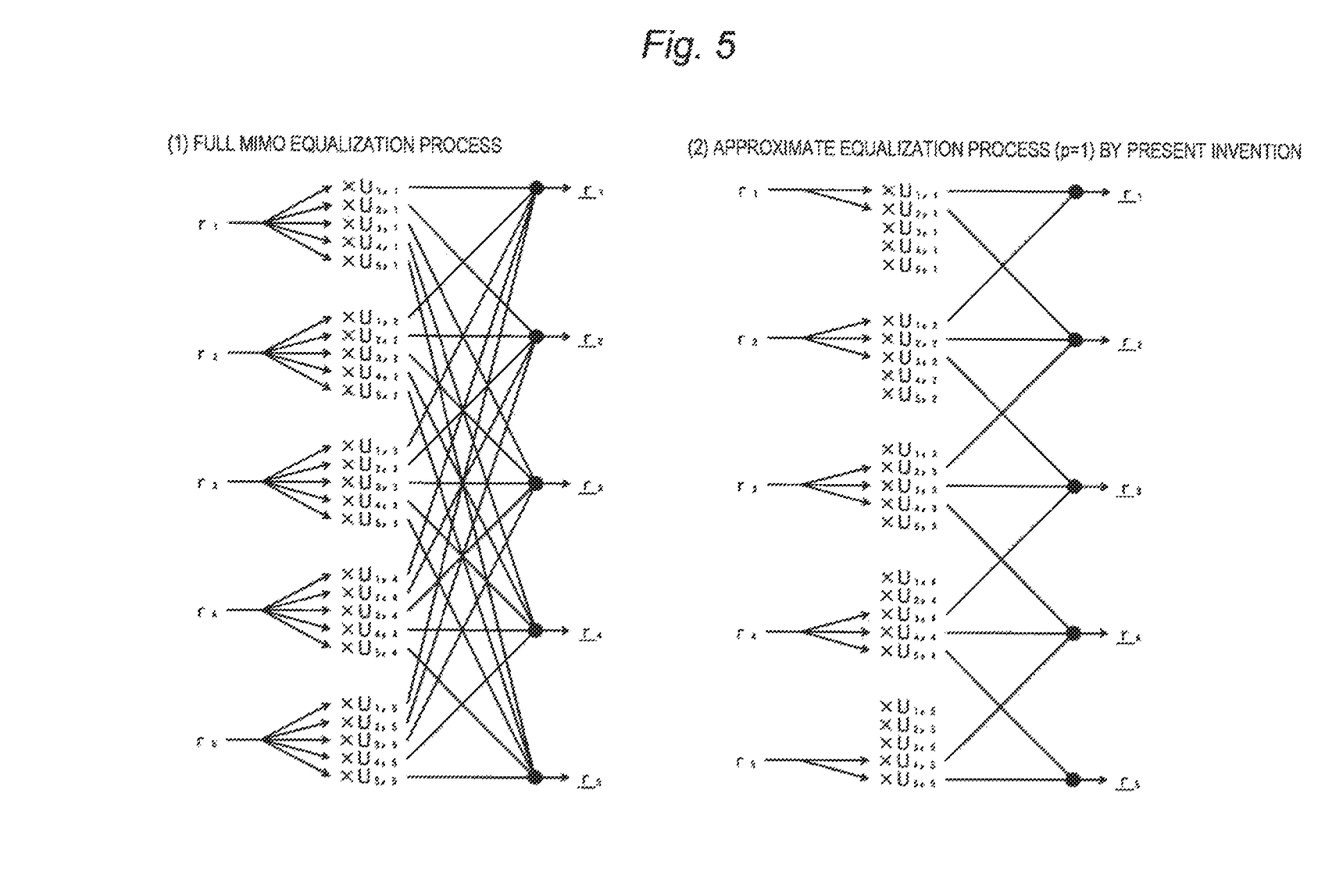
FIG. 5 is a diagram showing an example of processing by the channel estimation/interference compensation unit 23.

FIG. 5 shows an example of processing by the channel estimation/interference compensation unit 23.

(1) of FIG. 5 shows a processing example in which the signal $r_k$ of the OAM mode k, which is separated by the OAM mode separation units 22-1 to 22-$N_{RX}$ for each of the OAM modes 1 to 5, is input to the channel estimation/interference compensation unit 23, the signal $r_k$ is multiplied by the weights $U_{1,k}$ to $U_{5,k}$ associated with interference from a subject OAM mode and the other OAM modes, and $\underline{r}_k = \Sigma U_{k,m} r_m$ (where $m=1$ to 5)

is output as the signal $\underline{r}_k$ of the OAM mode k subjected to inter-mode interference compensation. In other words, the following results are obtained.

$\underline{r}_1 = U_{1,1}r_1 + U_{1,2}r_2 + U_{1,3}r_3 + U_{1,4}r_4 + U_{1,5}r_5$ $\underline{r}_2 = U_{2,1}r_1 + U_{2,2}r_2 + U_{2,3}r_3 + U_{2,4}r_4 + U_{2,5}r_5$ $\underline{r}_3 = U_{3,1}r_1 + U_{3,2}r_2 + U_{3,3}r_3 + U_{3,4}r_4 + U_{3,5}r_5$ $\underline{r}_4 = U_{4,1}r_1 + U_{4,2}r_2 + U_{4,3}r_3 + U_{4,4}r_4 + U_{4,5}r_5$ $\underline{r}_5 = U_{5,1}r_1 + U_{5,2}r_2 + U_{5,3}r_3 + U_{5,4}r_4 + U_{5,5}r_5$ In this case, since the computation process is executed on the squared order of an OAM mode multiplex number and the computation amount is exponentially increased according to the multiplex number, the above processing may be applied only to a case where there is no restriction in a circuit scale.

Here, since the inter-mode interference dominantly depends on interference from an adjacent mode, only a band-shaped channel matrix indicated by a dashed line that is adjacent to a channel matrix of the subject mode indicated by a thick frame in FIG. 4 is taken into consideration. Thus, an approximate process is possible in which the band-shaped channel matrix and a band-shaped approximate weight calculated by the use of an inverse matrix thereof are used for compensating for the interference.

(2) of FIG. 5 shows a processing example in which the signal $r_k$ of the OAM mode k input to the channel estimation/interference compensation unit 23 is multiplied by the weights $U_{k-p,k}$ to $U_{k+p,k}$ associated with interference from the subject OAM mode and adjacent OAM modes adjacent to the subject OAM mode by p, and $\underline{r}_k = \Sigma U_{k,m} r_m$ (where $m=k-p$ to $k+p$)

is output as the signals $\underline{r}_k$ of the OAM mode k subjected to inter-mode interference compensation. In the present example, the number p of the adjacent modes considered is 1.

The adjacent mode selection unit 32-$k$ shown in FIG. 3 selects the signals $r_{k-1}$ to $r_{k+1}$ of OAM modes k−1 to k+1 from among the signals $r_1$ to $r_5$ of the OAM modes 1 to 5. The weight multiplication unit 33-$k$ multiplies the signals $r_{k-1}$ to $r_{k+1}$ by the weights $U_{k,k-1}$ to $U_{k,k+1}$ correspondingly, and outputs $\underline{r}_k = U_{k,k-1}r_{k-1} + U_{k,k}r_k + U_{k,k+1}r_{k+1}$ as the signals $\bar{r}_k$ of the OAM mode k subjected to inter-mode interference compensation. In other words, when k=1 to 5, the following results are obtained.

$\underline{r}_1 = U_{1,1}r_1 + U_{1,2}r_2$ $\underline{r}_2 = U_{2,1}r_1 + U_{2,2}r_2 + U_{2,3}r_3$ $\underline{r}_3 = U_{3,2}r_2 + U_{3,3}r_3 + U_{3,4}r_4$ $\underline{r}_4 = U_{4,3}r_3 + U_{4,4}r_4 + U_{4,5}r_5$ $\underline{r}_5 = U_{5,4}r_4 + U_{5,5}r_5$ Such the approximate equalization process of the weights can reduce the computation process as shown in (2) of FIG. 5.

Figure 6:
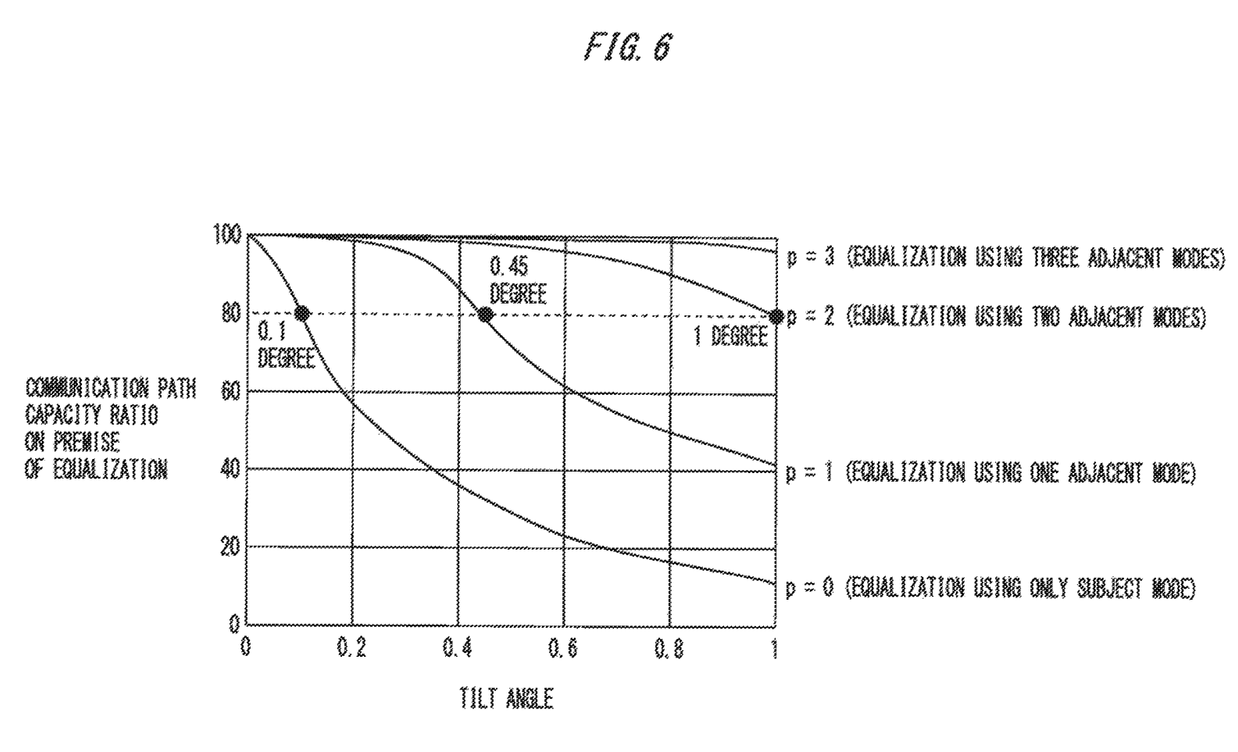
FIG. 6 is a diagram showing performance characteristics according to adjacent mode considered.

FIG. 6 shows performance characteristics according to the adjacent mode considered.

In FIG. 6, a transverse axis represents a tilt angle of an antenna, and a longitudinal axis represents a communication path capacity ratio in which a capacity in a case of MMSE equalization with no approximation is set to 100%.

The present simulation is performed based on the following conditions.

Frequency: 28.5 GHz

Numbers $N_{TX}$ and $N_{RX}$ of UCAs: four (each ring includes sixteen elements)

Multiplex mode: multiplexing of −2 to +2 for each UCA, and a total of twenty modes Transmission distance: 5 m Equalization weight: MMSE In this example, if capacity deterioration is allowed up to 20%, a deviation up to 0.1 degrees can be compensated for in a case of p=0 where the equalization is performed by using only the subject mode, a deviation up to 0.45 degrees can be compensated for in a case of p=1 where the equalization is performed by using one adjacent mode, and a deviation up to 1 degree can be compensated for in a case of p=2 where the equalization is performed by using two adjacent modes. In a case of p=3 where the the equalization is performed by using three adjacent modes with respect to the number of multiplex modes of five, performance close to the full MIMO equalization process shown in (1) of FIG. 5 can be obtained.

A method of determining the adjacent mode p to be considered is as follows.

First, at p=0, a known signal sequence transmitted from the transmitting station, for example, a preamble for channel estimation is multiplied by the approximate weight for the subject mode only. A cost is calculated based on a Euclid distance between the weight multiplication result and a signal point of the known signal sequence, an EVM, an SINR, an absolute value of a difference between an equalizer output when the equalizer is not approximated and an approximate equalizer output, and the like. If the cost calculated here exceeds a threshold value that is preset by a manager or the like, the weight is determined as the weight for the parameter p. If the cost does not exceed the threshold value, p is incremented by +1, an approximate weight including the subject mode and the adjacent mode is determined, and it is determined whether or not the cost calculated similarly exceeds the threshold value. When the performance of the equalization process exceeds a certain predetermined criterion, a value of the previous p is determined as a parameter for approximation of an equalizer, and weight approximation is performed. Then, the received signal is multiplied by the determined weight to compensate for the the inter-mode interference.

It should be noted that the value of p may be a fixed value that is preset by a system manager in accordance with accuracy of an antenna position calibrator. For example, when the accuracy of the calibrator is ±0.4 degrees and there is a margin of 20% in a system capacity, p is always set to 1 because capacity deterioration of 20% can be permitted.

(Another Method)

In the present method, the interference component is approximated by the band matrix, and the equalization is performed by using the weight.

In the present method, the equalization process can be performed with the computation amount lower than in a case of full MIMO where the equalization process is performed over the all signal sequences. Calculation required for deriving the inverse matrix required for calculating the weight is not necessary as will be described below. Thus, even when an antenna fluctuates due to vibration caused by wind or the like and thus a channel varies, it is not necessary to calculate the inverse matrix every time for calculating the weight.

As in the characteristics of the channel matrix in the method described with reference to FIGS. 3 to 5, when the antennae are not in the ideal facing disposition, the channel matrix has a band shape and the interference from the adjacent mode is strong. In a method described below, the channel matrix is approximated as a band matrix instead of approximating the weight, and a process of multiplying the approximated channel matrix by the weight is performed.

Figure 7:
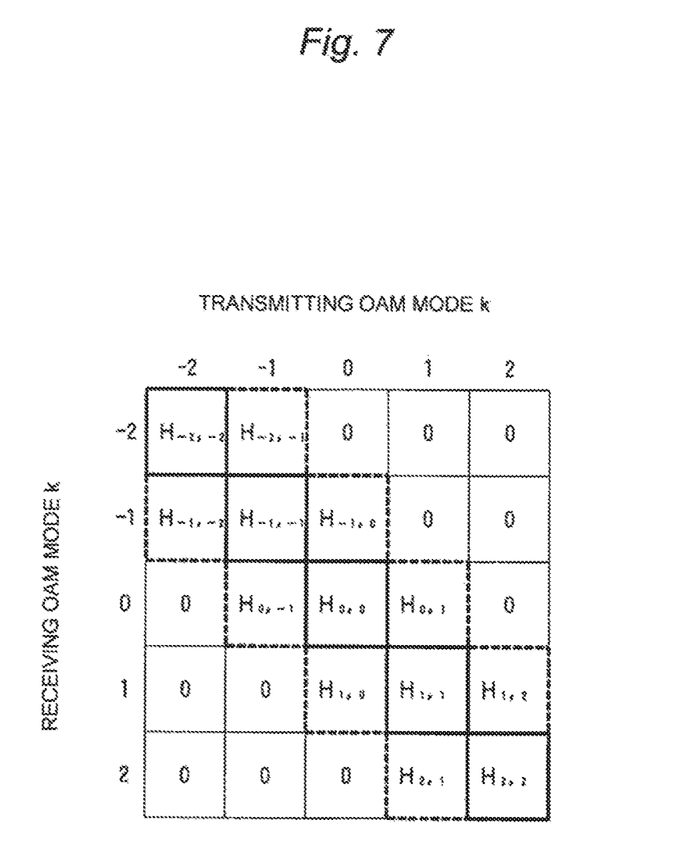
FIG. 7 is a diagram showing an example of an approximate channel matrix.

First, a band width p is introduced. For example, if p is 1, the channels are approximated to be a band shape as shown in FIG. 7. When the channel matrix H after approximation is indicated by $\underline{H}$, an approximate expression of a received signal R with respect to a transmission signal S is $$R \sim \underline{H}S.$$

A result of multiplying the received signal R by an approximate MMSE weight is expressed as follows by using the signal to noise power ratio SNR and the unit matrix I.

$$R' = (\underline{H}^H \underline{H} + SNR \cdot I)^{-1} \underline{H}^H R$$

According to the present method, the above can be calculated without calculating the inverse matrix $(\underline{H}^H \underline{H} + SNR \cdot I)^{-1}$.

First, the following calculation is performed.

$$H^* = (\underline{H}^H \underline{H} + SNR \cdot I)$$

H* is subjected to Cholesky decomposition.

$$H^* = QQ^H$$

Since H* is the band matrix, Q is also a band matrix having the same band width as that of H* and is a lower triangular matrix. Next, the following calculation is performed.

$$z = \underline{H}^H R$$

In this calculation, it is enough to perform the calculation process with respect to only the band matrix portion. Next, the following equation is solved with respect to f.

$$Qf = z$$

Here, since Q is the lower triangular matrix and the band matrix, the equation can be sequentially solved without deriving an inverse matrix of Q. Any algorithm can be used for solving the equation.

Next, the following equation is solved with respect to R'.

$$Q^H R' = f$$

Here, snice QH is an upper triangular matrix and the band matrix, the equation can be sequentially solved without deriving an inverse matrix of Q. Any algorithm can be used for solving the equation.

The computation result Q obtained through the Cholesky decomposition may be applied to equalization of subsequent signal sequences. In other words, calculation of H* and the Cholesky decomposition may be performed only once in the interference elimination process, and then only z and f may be processed in computation of a data portion that subsequently arrives.

In the present method, the interference compensation process is entirely performed on the receiving side The same interference compensation effect can be achieved by using an apparatus performing the same process on the transmitting side.

REFERENCE SIGNS LIST

10 TRANSMITTING STATION
11 TRANSMITTING UCA
12 OAM MODE GENERATION UNIT
20 RECEIVING STATION
21 RECEIVING UCA
22 OAM MODE SEPARATION UNIT
23 CHANNEL ESTIMATION/INTERFERENCE COMPENSATION UNIT
31 CHANNEL ESTIMATION/WEIGHT CALCULATION UNIT
32 ADJACENT MODE SELECTION UNIT
33 WEIGHT MULTIPLICATION UNIT

The invention claimed is:

1. An OAM multiplexing communication system that uses one or more orbital angular momentum (OAM) modes and multiplexes signals of one or more sequences for each OAM mode, the OAM multiplexing communication system comprising:
    a transmitting station including:
        a transmitting antenna that uses an M-UCA in which a plurality of uniform circular arrays (UCAs) having different diameters are concentrically disposed, each UCA having a plurality of antenna elements disposed circularly at an equal interval; and an OAM mode generation unit that simultaneously generates the one or more OAM modes from each UCA of the transmitting antenna; and a receiving station including:

a receiving antenna that has a configuration equivalent to the M-UCA;

an OAM mode separation unit that separates signals received by each UCA of the receiving antenna for each OAM mode; and a channel estimation/interference compensation unit that estimates a channel matrix for each OAM mode separated from the signals received by the each UCA of the receiving antenna, and compensates for inter-mode interference between the OAM modes by using a weight calculated from the channel matrix, wherein the channel estimation/interference compensation unit is configured to select, for each OAM mode, signals of a subject mode and an adjacent mode from among the signals of the OAM modes separated by the OAM mode separation unit, and to compensate for the inter-mode interference by multiplying an approximate weight calculated by using channel matrixes of the subject mode and the adjacent mode.

2. The OAM multiplexing communication system according to claim 1, wherein the channel estimation/interference compensation unit is configured to determine, as a range of the adjacent mode, a range in which a performance of an equalization process using the approximate weight calculated based on a known signal sequence transmitted from the transmitting station satisfies a predetermined criterion.

3. The OAM multiplexing communication system according to claim 1, wherein the channel estimation/interference compensation unit is configured to use an approximate channel matrix obtained by approximating the channel matrix as a band matrix to compensate for the inter-mode interference based on Cholesky decomposition of a matrix including the approximate channel matrix.

4. An inter-mode interference compensation method for an OAM multiplexing communication system that uses one or more orbital angular momentum (OAM) modes and multiplexes signals of one or more sequences for each OAM mode, wherein the OAM multiplexing communication system comprises:

a transmitting station including:

a transmitting antenna that uses an M-UCA in which a plurality of uniform circular arrays (UCAs) having different diameters are concentrically disposed, each UCA having a plurality of antenna elements disposed circularly at an equal interval; and an OAM mode generation unit that simultaneously generates the one or more OAM modes from each UCA of the transmitting antenna; and a receiving station including:

a receiving antenna that has a configuration equivalent to the M-UCA;

an OAM mode separation unit that separates signals received by each UCA of the receiving antenna for each OAM mode; and a channel estimation/interference compensation unit that estimates a channel matrix for each OAM mode separated from the signals received by the each UCA of the receiving antenna, and compensates for inter-mode interference between the OAM modes by using a weight calculated from the channel matrix, wherein the inter-mode interference compensation method comprises:

selecting, by the channel estimation/interference compensation unit, for each OAM mode, signals of a subject mode and an adjacent mode from among the signals of the OAM modes separated by the OAM mode separation unit, and compensating for the inter-mode interference by multiplying an approximate weight calculated by using channel matrixes of the subject mode and the adjacent mode.

5. The inter-mode interference compensation method according to claim 4, wherein the channel estimation/interference compensation unit determines, as a range of the adjacent mode, a range in which a performance of an equalization process using the approximate weight calculated based on a known signal sequence transmitted from the transmitting station satisfies a predetermined criterion.

6. The inter-mode interference compensation method according to claim 4, wherein the channel estimation/interference compensation unit uses an approximate channel matrix obtained by approximating the channel matrix as a band matrix to compensate for the inter-mode interference based on Cholesky decomposition of a matrix including the approximate channel matrix.

* * * * *